United States Patent
Puri

(10) Patent No.: US 9,607,215 B1
(45) Date of Patent: Mar. 28, 2017

(54) FINGER DETECTION IN 3D POINT CLOUD

(71) Applicant: Amazon Technologies, Inc., Seattle, WA (US)

(72) Inventor: Manika Puri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 14/495,629

(22) Filed: Sep. 24, 2014

(51) Int. Cl.
*G06K 9/00* (2006.01)

(52) U.S. Cl.
CPC .................... *G06K 9/00355* (2013.01)

(58) Field of Classification Search
None
See application file for complete search history.

(56) References Cited

U.S. PATENT DOCUMENTS

| | | | | | |
|---|---|---|---|---|---|
| 8,280,126 | B2 * | 10/2012 | Dam | ...................... | A61B 5/055 382/128 |
| 8,620,024 | B2 * | 12/2013 | Huang | .................... | G06F 3/017 348/169 |
| 8,830,312 | B2 * | 9/2014 | Hummel | .............. | G06K 9/6202 348/77 |
| 8,878,906 | B2 * | 11/2014 | Shotton | .............. | H04N 13/0203 348/46 |
| 2004/0217956 | A1 * | 11/2004 | Besl | ........................ | G06T 15/00 345/419 |
| 2012/0314031 | A1 * | 12/2012 | Shotton | .............. | H04N 13/0203 348/46 |

OTHER PUBLICATIONS

Badino, et al., "Fast and Accurate Computation of Surface Normals from Range Images", International Conference on Robotics and Automation (ICRA), Shanghai, China, May 9-13, 2011, 8 pages.

* cited by examiner

*Primary Examiner* — Soo Jin Park
(74) *Attorney, Agent, or Firm* — Lee & Hayes, PLLC

(57) ABSTRACT

Techniques are described for detecting the presence and positions of fingers using depth information. For each of multiple target points represented by a depth image, an evaluation is performed using a region of points surrounding the pixel. The region has an inner zone and side zones. Multiple iterations are performed for each target pixel, with different sizes and orientations of the region being used in the different iterations. An average depth and an average surface normal direction are determined for each zone. The average depth and average surface normal direction of the inner zone are compared to the average depths and the average surface normal directions of the side zones to determine whether the target pixel is part of a finger.

25 Claims, 5 Drawing Sheets

FINGER DETECTION IN 3D POINT CLOUD

BACKGROUND

User interfaces have traditionally relied on input devices such as keyboards, which require physical manipulation by a user. Increasingly, however, it is desired to detect and monitor the physical positions and movements of users within a scene or environment. User motions and gestures can be used in some environments as user commands and inputs to automated systems. In particular, hand positions and gestures may be useful in providing input from a user to a computerized system. When detecting or analyzing a hand positions, it is useful to detect the fingers of the hand and their positions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
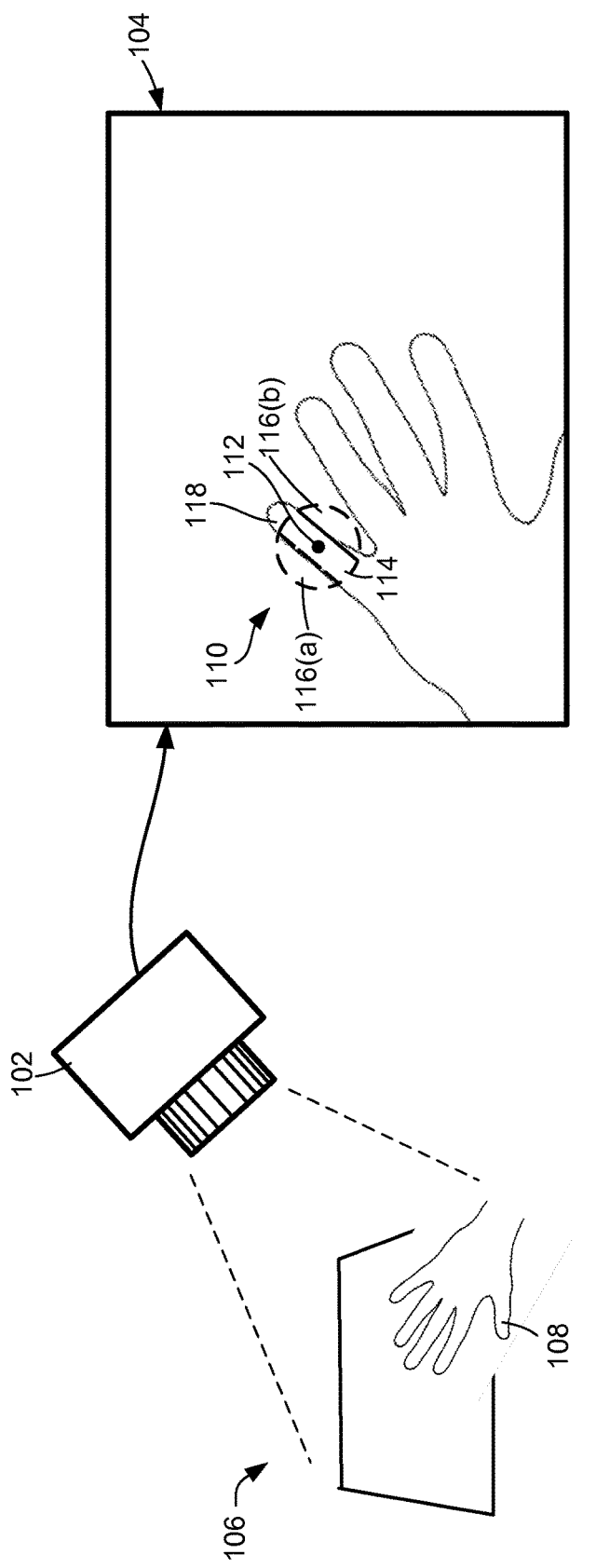
FIG. 1 is a block diagram conceptually illustrating a portion of a technique for identifying fingers and their positions based on a depth image.

This disclosure describes systems and techniques for detecting the presence and locations of human fingers. A depth camera or sensor is used to produce a depth image or depth map of an area containing parts of a user hand including one or more fingers. Each depth image contains pixels corresponding respectively to points on surfaces of the captured area and indicates the relative depths of the surface points. An evaluation is performed for each surface point to determine whether it corresponds to the surface of a finger.

For a particular surface point that is being evaluated, referred to as a target point, a region surrounding the target point is selected. The region is divided into three zones: an elongated inner zone that extends across or through the region and side zones that are on opposite sides of the inner zone.

An average surface normal direction is calculated for each zone based on the surface normal directions of the individual surface points within the zone. The target point that the region surrounds is declared to be a finger point candidate based on a comparison of the average surface normal direction of the inner zone to the average surface normal directions of the side zones. In particular, the target point may be considered to be part of a finger if the average surface normal direction of the inner zone differs from the average surface normal direction of each of the side zones by more than a given surface normal threshold.

In some configurations, an additional comparison of another property between the zones, such as depth, color or intensity, may be performed to determine whether the target point is likely to be part of a finger. Specifically, the target point is considered to be a finger point candidate only if the average of the property within each of the side zones differs from the average of the property within the inner zone by more than a given property threshold.

The evaluation is repeated using differently sized and oriented regions to account for different distances of fingers from the depth sensor and different finger orientations. If the criteria described above are satisfied for a region having any of the different sizes or orientations, the target point is declared to be a candidate point a finger.

In one implementation, each region is selected as an area within a circle. The inner zone of the region extends across or through the circle along a diameter or central chord of the circle. The side zones are formed by the remaining portions of the circle on either side of the inner zone. The length of the inner zone is approximately equal to the diameter of the circle. The width of the inner zone is selected so that the inner zone is approximately proportional in length and width to a typical or average human finger.

The described techniques can be used to detect fingers or centerlines of fingers in situations where remaining portions of the hand are not visible or where only partial fingers are visible due to occlusion or limited fields of view.

FIG. 1 shows example techniques for evaluating an image in this manner to detect the presence and positions of fingers within a depth image. In this example, a depth camera or sensor 102 captures or produces a depth image 104 of a scene 106 containing a human hand 108. The depth image 104 comprises a two-dimensional, rectangular array of pixel values, each of which corresponds to point on a surface that is observed by the depth sensor 102 within the scene 106. Each pixel value indicates the relative depth of the corresponding surface point.

The depth image 104 may at times be referred to as a depth map or a three-dimensional (3D) image. Two dimensions of positional information are indicated for a surface point by the position of the corresponding pixel value within the array. A third positional dimension is added by the pixel value itself, which indicates depth. A depth image such as this may also be referred to as a 3D point cloud, in that it inherently indicates 3D coordinates of multiple surface points. In some cases, images captured by the sensor 102 or other camera may indicate other properties such as color and intensity.

FIG. 1 shows an example of surface point region 110 that may evaluated to determine whether a target point 112 surrounded by the surface point region 110 is part of a finger. In this example, the region 110 is circular, having a central or inner zone 114 and two side zones 116. The side zones 116 are also referred to herein as first and second side zones 116(a) and 116(b). The region 110 is selected so that the target point 112 is at the center of the region 110.

In this example, the position and orientation of the region 110 results in an alignment of the inner zone 120 with a finger 118 that is present in the image 104. This of course will not be the case with all positions and orientations of the region 110. However, the evaluation described below will indicate a relatively high likelihood of the target point 112 being a finger when the region 110 is selected with the illustrated position and orientation. As will be described, the evaluation of a particular target point is iterated with multiple region sizes and orientations in the expectation that at least one size/orientation combination will align with each finger represented by the image 104.

Figure 2:
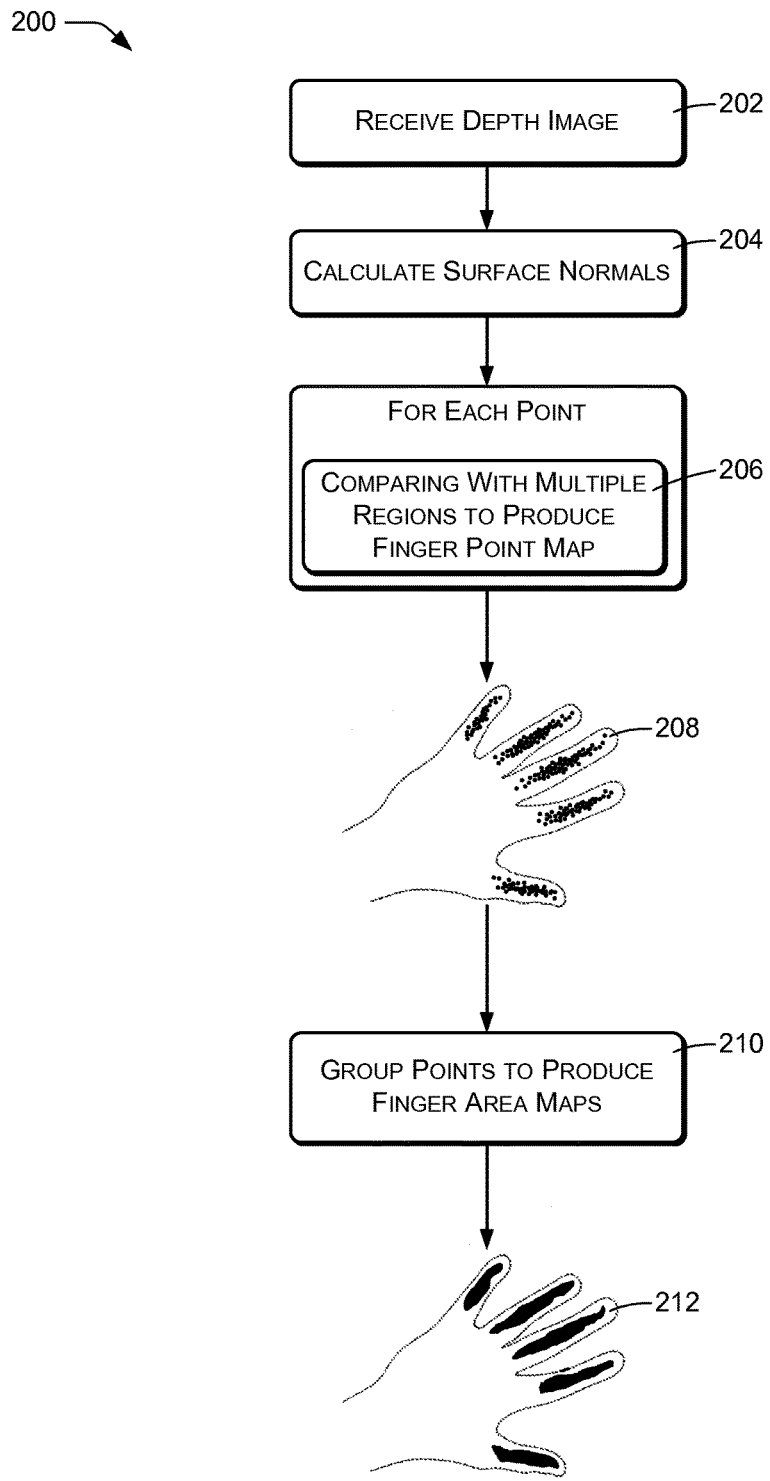
FIG. 2 is a flow diagram further illustrating a technique for identifying fingers and their positions.

FIG. 2 illustrates an example method 200 that may be used in the context of FIG. 1 to determine the presence and positions of fingers within the image 104.

An action 202 may comprise receiving the image 104, which indicates a relative depth of each of a plurality of surface points within the observed scene 106. The image 104 may include a portion of the scene 106 that contains a hand or fingers of a hand. In some cases the image may indicate additional properties such as color or intensity.

In a depth image surface points are represented by pixels or pixel values in the image. For purposes of discussion, the term "point" or "surface point" will be used interchangeably with the term "pixel," since each pixel of the image corresponds directly with a surface point of the captured scene. The value of a pixel corresponds to the depth of the corresponding surface point.

An action 204 comprises calculating a surface normal direction for each surface point of the depth image 104. The normal direction with respect to a surface point is the direction that is normal to the average plane of the surface of which the point is a part, in the vicinity of the point. The surface normal direction may also be referred to as a normal vector or as the normal direction.

The surface normal of a surface point in a 3D cloud can be calculated in various ways. As one example, the surface normal can be calculated as the cross product of surrounding or neighboring points. As another example, the surface normal may calculated as the direction perpendicular to a plane that is fitted to a set of neighboring or surrounding points. Various other techniques, some of which may more computationally efficient, may alternatively be used to determine surface normals.

An action 206 comprises, for each point in the received image, which is referred to as a target point, selecting multiple regions 110 surrounding the target point and comparing characteristics of zones within each region 110 to determine whether the target point is likely to correspond to the surface of a finger.

Figure 3:
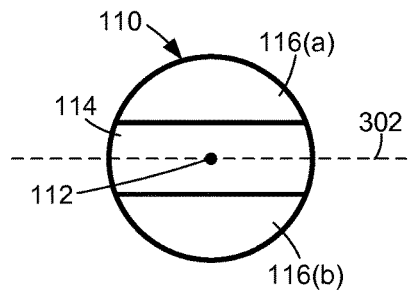
FIG. 3 illustrates construction of an example region that may be selected and used in the described techniques for identifying fingers and their positions.

FIG. 3 shows further details of an example image region 110 that may be selected for a particular target pixel 112. In this example, the region 110 is a circular region that is bilaterally symmetric about a diameter or central chord 302 that passes through the center point of the region 110, which coincides with the target pixel 112.

The image region 110 has an elongated central or inner zone 114 that is approximately rectangular and that extends across or through the image region 110. The inner zone 114 may have a length and width that are proportional to the length and width of an average human finger. The inner zone 114 is bilaterally symmetric about the central chord 302.

The image region 110 has side zones 116(a) and 116(b) that are opposite each other, on opposite sides of the inner zone 114. The side zones 116 are bilaterally symmetric with respect to each other about the central chord 304 and about the inner zone 114. The inner zone 114 extends across the region 110 between the side zones.

Figure 4:
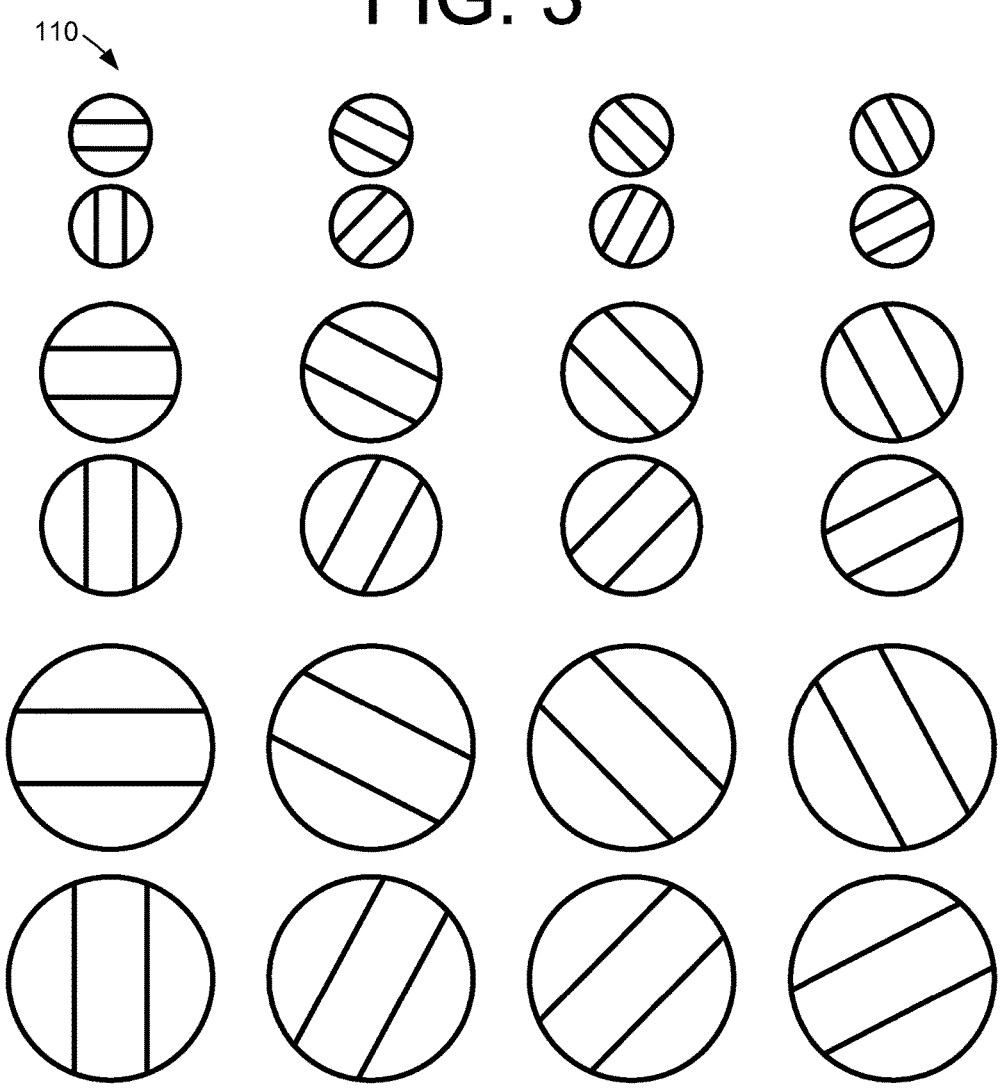
FIG. 4 illustrates an example of different sizes and orientations of regions that may be used in conjunction with the described techniques.

FIG. 4 shows examples of differently sized and oriented regions 110 that may be used in conjunction with the action 206 to determine whether a particular target point is a finger surface. As mentioned above, the action 206 is performed using multiple regions that are selected to have different sizes and orientations. The examples of FIG. 4 include image regions 110 having three different sizes or diameters. At each size, eight different orientations are included, at 0°, 22.5°, 45°, 67.5°, 90°, 112.5°, 135°, and 157.5°. In this example, the orientation of each region is defined by the longitudinal axis of the central region with respect to horizontal. In practice, however, the orientations are relative to an arbitrary reference angle.

Although the presented example uses eight orientations at each of three different sizes, different numbers of orientations and sizes may be used in different embodiments.

The different region orientations accommodate different orientations of fingers within the image 104. The different region sizes accommodate different sizes of fingers as well as different apparent sizes due to different distances of the hand 108 from the camera in different captured scenes.

Figure 5:
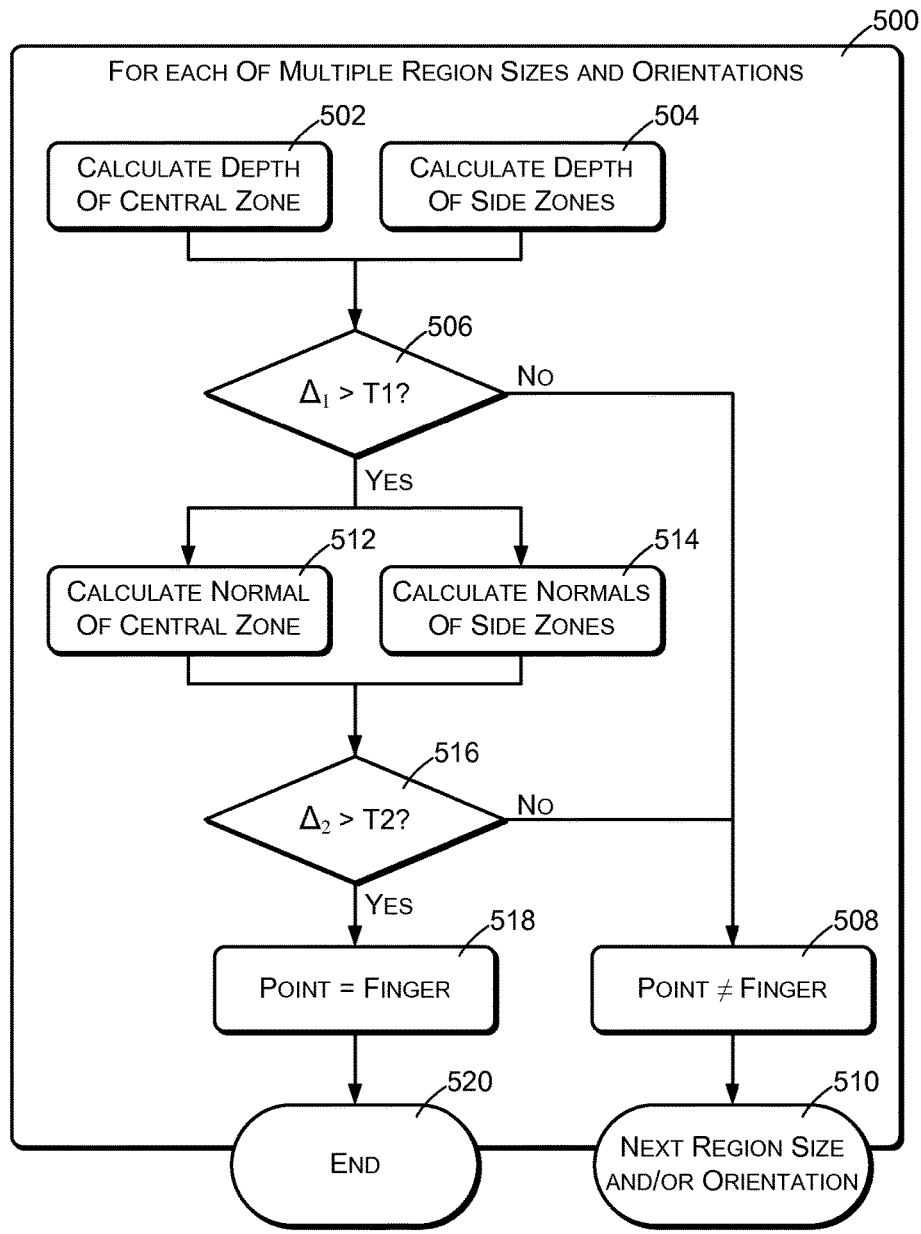
FIG. 5 is a flow diagram illustrating further details of the described technique for identifying fingers and their positions.

FIG. 5 shows an example method 500 of determining whether a target point is likely to be part of a finger, which may be performed as part of the action 206. At each target point, the method 500 is repeated for each of multiple sizes and orientations of regions, such as the sizes and orientations illustrated by FIG. 4. Any point that is determined to likely be part of a finger is declared to be a candidate point.

An action 502 comprises calculating the surface depth of the inner zone 114, which may comprise calculating an average of the surface depths of the surface points within the inner zone 114. An action 504 comprises calculating the surface depths of the side zones 116, which may comprise averaging the surface depths of the surface points within the first side zone 116(a) and averaging the surface depths of the surface points within the second side zone 116(b).

More generally, the actions 502 and 504 may comprise:
  determining a surface depth of the first side zone 116(a) based at least in part on the depths of multiple surface points of the first side zone 116(a);
  determining a surface depth of the second side zone 116(b) based at least in part on the depths of multiple surface points of the second side zone 116(b); and
  determining a surface depth of the inner zone 114 based at least in part on the depths of multiple surface points of the inner zone 114.

An action 506 comprises comparing the depth or average surface depth of the inner zone 114 with the depths or average depths of each of the side zones 116(a) and 116(b). More specifically, the action 506 comprises determining whether the difference or delta $\Delta_1$ between the depth or average depth of the inner zone 114 and the depth or average depth of each of the side zones 116(a) and 116(b) is greater than a first threshold T1. If not, an action 508 is performed comprising indicating that the target point is not part of a finger, and the method 500 is repeated using the next region size or orientation as indicated by the block 510.

If the difference or delta $\Delta_1$ between the average depth of the inner zone 114 and each of the side zones 116(a) and 116(b) is greater than the threshold T1, actions 512 and 514 are performed.

The action 512 comprises calculating the surface normal direction of the inner zone 114, which may comprise averaging the surface normal directions of the surface points within the inner zone 114. The action 514 comprises calculating the surface normal directions of the side zones 116, which may comprise averaging the surface normal directions of the surface points within the first side zone 116(a) and averaging the surface normal directions of the surface points within the second side zone 116(b).

More generally, the actions 512 and 514 may comprise:

determining a surface normal direction of the first side zone 116(a) based at least in part on surface normal directions of multiple surface points of the first side zone 116(a);

determining a surface normal direction of the second side zone 116(b) based at least in part on surface normal directions of multiple surface points of the second side zone 116(b); and determining a surface normal direction of the inner zone 114 based at least in part on surface normal directions of multiple surface points of the inner zone 114.

An action 516 comprises comparing the surface normal direction or the average surface normal direction of the inner zone 114 with the surface normal directions or average surface normal directions of each of the side zones 116(a) and 116(b). More specifically, the action 516 comprises determining whether the difference or delta $\Delta_2$ between the average surface normal direction of the inner zone 114 and the average surface normal direction of each of the side zones 116(a) and 116(b) is greater than a threshold T2. If not, the action 508 is performed to indicate that the target point is not part of a finger, and the method 500 is repeated using the next region size or orientation as indicated by the block 510.

If the difference or delta $\Delta_2$ between the average surface normal direction of the inner zone 114 and the average surface normal direction of each of the side zones 116(a) and 116(b) is greater than the threshold T2, an action 518 is performed of declaring that the target point is a candidate surface point of a finger, and the method 500 is ended as indicated by the block 520. Note however that the method 500 is then repeated for other target points.

The calculations and comparisons described above may use signed values, and the thresholds may be set so that convex or tubular surfaces are detected rather than concave surfaces. Appropriate values of the thresholds may be determined by observation, testing, and/or training. In some cases, a machine learning classifier, such as a support vector machine, may be trained to learn the thresholds and to thereby classify whether a point belongs to a finger.

As already noted, the method of FIG. 5 is performed in multiple iterations with respect to each target point. The iterations with respect to a single target point use one or more of (a) different sizes of the circular region or (b) differently oriented zones within the circular region.

In some embodiments, the actions 502 and 504 may be performed with respect to surface properties or characteristics other than depth. For example, an image of the scene containing the hand may indicate color or intensity of individual surface points. The action 502 may comprise calculating an average color or intensity of the inner zone 114. The action 504 may comprise calculating an average color or intensity of the side zones 116(a) and 116(b). The action 506 may comprise determining whether a target surface point is a candidate point of a finger surface by comparing the average color or intensity of the inner zone with the average color or intensity of the side zones. The surface point may be declaring as a candidate point when the difference between the average color or intensity of the inner zone and the average color or intensity of each of the side zones is greater than the threshold T1.

Returning to FIG. 2, the action 206 produces or results in a finger candidate map 208, which comprises a binary image indicating points of the image map 104 that are likely to correspond to a finger or finger surface. Generally, the points will be clustered along centerlines of the fingers. Note that the contour of a hand is shown in conjunction with the finger candidate map 208 in FIG. 2 only for purposes of illustration; the finger candidate map 208 does not specifically indicate such a contour.

An action 210 comprises identifying a connected group of the image surface points to produce a finger centerline map 212. The finger centerline map 212 comprises a binary image indicating portions of the image map 104 that are likely to correspond to fingers or finger surfaces. Generally, the points identified by the centerline map 212 will correspond to points along the center of a finger, which are more likely to satisfy the conditions evaluated by the method 500 of FIG. 5. Again, the contour of a hand is shown in conjunction with the finger centerline map 212 in FIG. 2 only for purposes of illustration; the finger centerline map 212 does not specifically indicate such a contour.

The action 210 may be performed in some implementations using connected component labeling techniques, also referred to as region extraction, to detect connected regions within a binary image. Specifically, each indicated point of the finger candidate map 208 may be analyzed to determine whether it has nearby neighbors—pixels within 4 to 8 pixels, for example—that are also candidate finger points. If such neighbors are found, pixels between the point and the neighboring points are also marked as finger points. These steps are performed recursively to form contiguous groups of pixels.

Figure 6:
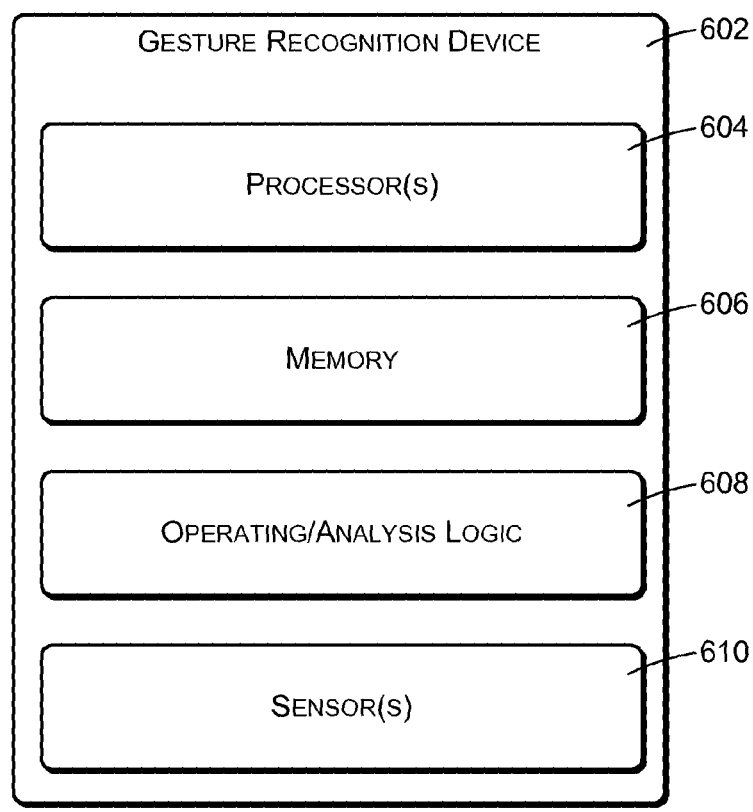
FIG. 6 is a block diagram of an example device that may be configured to identifying fingers and their positions based on the techniques described herein.

FIG. 6 illustrates high-level components of a device 602 that may be configured to implement the methods and techniques described above. In some embodiments, the device 602 may comprise a gesture recognition device that recognizes hand and finger actions, positions, and gestures that are performed as user input to a computing device or other automated system. For example, such a gesture recognition device may monitor positions and movements of fingers relative to a surface to determine whether a user is touching the surface, moving a finger along the surface, tapping the surface, etc. In some cases, the surface may comprise a display upon which interactive controls are presented, and the user may touch and manipulate the controls in order to interact with a computing system. The gesture recognition device 602 may be used in conjunction with such a computing system to detect interactions by the user with the displayed controls. Note that the device 602 may have other components that are not shown.

Logical functionality of the device 602 may be implemented by one or more processors 604, associated computer-readable memory 606, and software that is stored in the memory 606 and executed by the processor 604. The one or more processors 604 may include a processor having multiple cores as well as digital signal processors, application-specific integrated circuits (ASICs) and/or other types of processing devices. The software may comprise computer-executable instructions or programs.

The memory 606 may be a type of non-transitory computer-readable storage media and may include volatile and nonvolatile memory. Thus, the memory 606 may include, but is not limited to, RAM, ROM, EEPROM, flash memory, magnetic memory media, optical memory media, or other memory technology. The memory 606 may also comprise media that is used for transferring data and software, such as CD-ROMs, DVDs, memory sticks, etc. The memory 606 may reside in or be provided by various components of the device 602. The memory 606 may in some cases may be external to the device 602 and may accessed through network communications or other interfaces including wireless interfaces.

Software of the device 602 may include operating and analysis logic 608 that implements general functionality of the device 602 as described herein. The operating and analysis logic 608 may include an operating system, drivers for physical elements of the device 602, applications for performing specific functions or tasks, communication interfaces, etc. In the context of the example implementations described above, the operating and analysis logic 608 may include instructions that, when executed by the processors 604, cause the processor 604 to perform the acts described herein.

The gesture recognition device may also contain or be associated with one or more sensors 610, which may include a depth sensor for capturing depth images such as those described above. A depth sensor may use one or more of various technologies to capture depth information regarding an observed scene. For example, a depth sensor may emit infrared light and observe reflection times or times-of-flight of the infrared light at individual pixels of an image sensor. As another example, a structured-light sensor may be configured to project a structured light pattern on a scene and to analyze the reflections of the structured light to determine depth information. As yet another example, stereoscopic imaging may be used to obtain optical images of a scene from different perspectives and to compare the images to determine depth information regarding observed surface points within the scene.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a depth sensor configured to capture a depth image, wherein the depth image indicates a depth for each of a plurality of surface points;
   one or more computer-readable media storing computer-executable instructions that, when executed by the one or more processors, cause the one or more processors to perform acts comprising:
   selecting a target surface point of the plurality of surface points;
   selecting a circular region of surface points surrounding the target surface point, wherein the circular region has a first side zone and a second side zone that are opposite each other and an inner zone between the first side zone and the second side zone;
   averaging depths of surface points within the first side zone to determine an average depth of the first side zone, averaging depths of surface points within the second side zone to determine an average depth of the second side zone, and averaging depths of surface points within the inner zone to determine an average depth of the inner zone;
   averaging surface normal directions of surface points within the first side zone to determine an average surface normal direction of the first side zone, averaging surface normal directions of surface points within the second side zone to determine an average surface normal direction of the second side zone, and averaging surface normal directions of surface points within the inner zone to determine an average surface normal direction of the inner zone;
   determining that a first difference between the average depth of the inner zone and the average depth of the first zone is greater than a first threshold;
   determining that a second difference between the average depth of the inner zone and the average depth of the second zone is greater than the first threshold;
   determining that a third difference between the average surface normal direction of the inner zone and the average surface normal direction of the first zone is greater than a second threshold;
   determining that a fourth difference between the average surface normal direction of the inner zone and the average surface normal direction of the second zone is greater than the second threshold; and
   determining that the target surface point corresponds to a finger surface.

2. The system of claim 1, wherein:
   the inner zone is bilaterally symmetric about a diameter of the circular region; and
   the first zone and the second zone are bilaterally symmetric with respect to each other about the diameter of the circular region.

3. The system of claim 1, wherein the target surface point is at a center of the circular region.

4. The system of claim 1, the acts further comprising:
   selecting a second circular region of surface points surrounding the target surface point, wherein the second circular region has a third side zone, a fourth side zone, and a second inner zone; and
   wherein (a) the first circular region and the second circular region have different sizes or (b) the first inner zones and the second inner zone have different orientations.

5. The system of claim 1, the acts further comprising identifying a connected group of target points, wherein each target point of the connected group of target points corresponds to the finger surface.

6. A method, comprising:
   receiving a depth image corresponding to a scene, wherein the depth image comprises a plurality of surface points, and wherein the depth image indicates a depth of each of the plurality of surface points;
   selecting a region of the surface points surrounding a target surface point, wherein the region has a first zone and a second zone that are opposite each other and a third zone that is between the first zone and the second zone, wherein the first zone and the second zone are bilaterally symmetric with respect to each other about the third zone;
   determining a first surface normal direction based at least in part on a direction of at least a first surface point of the first zone;
   determining a second surface normal direction based at least in part on a direction of at least a second surface point of the second zone;
   determining a third surface normal direction based at least in part on a direction of at least a third surface point of the third zone;
   determining a first surface depth based at least in part on the depth of at least the first surface point;
   determining a second surface depth based at least in part on the depth of at least the second surface point;
   determining a third surface depth based at least in part on the depth of at least the third surface point; and
   determining that the target surface point corresponds to a finger surface based at least in part on the first surface normal direction, the second surface normal direction, the third surface normal direction, the first surface depth, the second surface depth, and the third surface depth.

7. The method of claim 6, wherein determining that the target surface point corresponds to a finger surface comprises:
comparing the third surface normal direction to the first surface normal direction;
comparing the third surface normal direction to the second surface normal direction;
comparing the third surface depth with the first surface depth; and
comparing the third surface depth with the second surface depth.

8. The method of claim 6, wherein the target surface point is within the third zone.

9. The method of claim 6, wherein:
the first surface normal direction is an average of the direction of the first point and at least one other point within the first zone;
the second surface normal direction is an average of the direction of the second point and at least one other point within the second zone; and
the third surface normal direction is an average of the direction of the third point and at least one other point within the third zone.

10. The method of claim 6, wherein:
the first surface depth is an average of the depth of the first point and at least one other point within the first zone;
the second surface depth is an average of the depth of the second point and at least one other point within the second zone; and
the third surface depth is an average of the depth of the third point and at least one other point the surface points within the third zone.

11. The method of claim 6, further comprising identifying a connected group of the target points, wherein each target point of the connected group of target points corresponds to the finger surface.

12. The method of claim 6, further comprising:
selecting a second region of surface points surrounding the target surface point, wherein the second region has a fourth zone, a fifth zone, and a sixth zone; and
wherein (a) the first region and the second region have different sizes or (b) the third zone and the sixth zone have different orientations.

13. The method of claim 6, wherein the region is a first region and the target surface point is a first target surface point, the method further comprises:
selecting a second region of the surface points, the second region having a different size than the first region; and
determining that a second target surface point corresponds to the finger surface based at least in part on an analysis of the second region of the surface points.

14. The method of claim 6, wherein the region is a first region and the target surface point is a first target surface point, the method further comprises:
selecting a second region of the surface points, the second region having a different orientation than the first region; and
determining that a second target surface point corresponds to the finger surface based at least in part on an analysis of the second region of the surface points.

15. One or more non-transitory computer-readable media storing computer-executable instructions that, when executed by one or more processors, cause the one or more processors to perform acts comprising:
receiving one or more images corresponding to a scene, the one or more images including a depth image comprising surface points, wherein the depth image indicates a depth of each of the surface points;
selecting a region of surface points surrounding a target surface point, wherein the region has a first zone, a second zone, and a third zone;
determining a first surface normal direction based at least in part on a direction of a first point of the first zone;
determining a second surface normal direction based at least in part on a direction of a second point of the second zone;
determining a third surface normal direction based at least in part on a direction of a third point of the third zone; and
determining that the target surface point corresponds to a finger surface based at least in part on:
analyzing the third surface normal direction with respect to the first surface normal direction; and
analyzing the third surface normal direction with respect to the second surface normal direction.

16. The one or more non-transitory computer-readable media of claim 15, wherein the one or more images indicate a property other than depth corresponding to the surface points, the acts further comprising:
determining a first average of a value associated with the property of the first point and at least one other point of the first zone;
determining a second average of a value associated with the property of the second point and at least one other point of the second zone; and
determining a third average of a value associated with the property of the third point and at least one other point of the third zone; and
wherein determining whether the target surface point corresponds to a finger surface is based at least in part on the first average, the second average, and the third average.

17. The one or more non-transitory computer-readable media of claim 16, wherein determining whether the target surface point corresponds to a finger surface comprises:
comparing the third average to the first average; and
comparing the third average to the second average.

18. The one or more non-transitory computer-readable media of claim 16, wherein the property other than depth comprises at least one of color or intensity.

19. The one or more non-transitory computer-readable media of claim 15, wherein the third zone extends through the region and the first zone and the second zone are on opposite sides of the third zone.

20. The one or more non-transitory computer-readable media of claim 15, wherein:
the first surface normal direction is an average of the direction of the first point and at least one other point within the first zone;
the second surface normal direction is an average of the direction of the second point and at least one other point within the second zone;
the third surface normal direction is an average of the direction of the third point and at least one other point within the third zone.

21. The one or more non-transitory computer-readable media of claim 15, further comprising:
determining a first surface depth based at least in part on a depth of the first point;
determining a second surface depth based at least in part on a depth of the second point;

determining a third surface depth based at least in part on a depth of the third point; and wherein determining whether the target surface point is a candidate point of a finger surface is performing based at least in part on the first surface depth, the second surface depth, and the third surface depth.

22. The one or more non-transitory computer-readable media of claim 21, wherein:
- the first surface depth is an average of the depth of the first point and at least one other point within the first zone;
- the second surface depth is an average of the depth of the second point and at least one other point within the second zone; and
- the third surface depth is an average of the depth of the third point and at least one other point within the third zone.

23. The one or more non-transitory computer-readable media of claim 15, the acts further comprising identifying a connected group of the target points, wherein each target point of the connected group of target points corresponds to the finger surface.

24. The one or more non-transitory computer-readable media of claim 15, wherein the first zone and the second zone are bilaterally symmetric with respect to each other about the third zone.

25. The one or more non-transitory computer-readable media of claim 15, the acts further comprising:
- selecting a second region of surface points surrounding the target surface point, wherein the second region has a fourth zone, a fifth zone, and a sixth zone; and
- wherein (a) the first region and the second region have different sizes or (b) the third zone and the sixth zone have different orientations.

* * * * *